United States Patent
Sun et al.

(10) Patent No.: US 10,123,328 B2
(45) Date of Patent: Nov. 6, 2018

(54) COEXISTENCE TECHNIQUES FOR WIDE AREA NETWORK DEVICES OPERATING IN UNLICENSED BANDS

(71) Applicant: Marvell World Trade Ltd., St. Michael (BB)

(72) Inventors: Yakun Sun, Sunnyvale, CA (US); Hongyuan Zhang, Fremont, CA (US); Mingguang Xu, San Jose, CA (US); Liwen Chu, San Ramon, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 425 days.

(21) Appl. No.: 14/555,084

(22) Filed: Nov. 26, 2014

(65) Prior Publication Data

US 2015/0146656 A1     May 28, 2015

Related U.S. Application Data

(60) Provisional application No. 61/908,997, filed on Nov. 26, 2013.

(51) Int. Cl.
*H04W 72/04* (2009.01)
*H04W 48/16* (2009.01)
(Continued)

(52) U.S. Cl.
CPC ....... *H04W 72/0453* (2013.01); *H04W 16/16* (2013.01); *H04W 48/16* (2013.01); *H04W 72/02* (2013.01); *H04W 88/06* (2013.01)

(58) Field of Classification Search
CPC ... H04B 7/0617; H04L 5/0007; H04L 5/0041; H04L 5/0092; H04L 27/2613;
(Continued)

(56) References Cited

U.S. PATENT DOCUMENTS 8,363,578 B1   1/2013 Ramamurthy et al.
8,670,399 B2   3/2014 Liu et al.
(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. Jan. 2695 (Mar. 29, 2012).

(Continued)

*Primary Examiner* — Marsha D. Banks Harold
*Assistant Examiner* — Dharmesh Patel

(57) ABSTRACT

A communication device is configured to operate in a first wireless communication network that utilizes a communication protocol developed for use in frequency bands that are licensed by a government entity for wireless communication applications. The communication device determines whether one or more communication channels in an unlicensed frequency band are not being utilized by any second wireless communication networks, wherein the government entity does not require licenses to use the unlicensed frequency band. In response to determining that one or more communication channels in the unlicensed frequency band are not being utilized by any second wireless communication networks, the communication device selects a set of one or more communication channels in the one or more communication channels for use by the first wireless communication network, and utilizes the set of one or more communication channels for communications in the first wireless communication network.

28 Claims, 6 Drawing Sheets

(51) Int. Cl.
    *H04W 16/16* (2009.01)
    *H04W 88/06* (2009.01)
    *H04W 72/02* (2009.01)

(58) Field of Classification Search
    CPC ..... H04W 16/14; H04W 16/16; H04W 24/00;
        H04W 28/08; H04W 28/16; H04W 48/16;
        H04W 72/02; H04W 72/042; H04W
        72/082; H04W 72/0406; H04W 72/0446;
        H04W 72/0453; H04W 72/1231; H04W
        74/0808; H04W 84/12; H04W 88/06
    See application file for complete search history.

(56) References Cited

U.S. PATENT DOCUMENTS

| | | | |
|---|---|---|---|
| 8,737,405 B2 | 5/2014 | Liu et al. | |
| 8,787,338 B2 | 7/2014 | Liu et al. | |
| 8,787,385 B2 | 7/2014 | Liu et al. | |
| 8,811,203 B1 | 8/2014 | Liu et al. | |
| 2008/0192644 A1 | 8/2008 | Utsunomiya et al. | |
| 2012/0307744 A1 | 12/2012 | Charbit et al. | |
| 2013/0163543 A1* | 6/2013 | Freda | H04W 72/0406 370/329 |
| 2013/0165134 A1* | 6/2013 | Touag | H04W 72/0486 455/452.1 |
| 2013/0310000 A1* | 11/2013 | Prasad | H04W 12/06 455/411 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
Cariou et al., "Multi-channel Transmissions," Doc. No. IEEE 802.11-09/1022r0, *The Institute of Electrical and Electronics Engineers, Inc.*, pp. 1-13 (Sep. 2009).
Yuan et al., "Carrier Aggregation for LTE-Advanced Mobile Communication Systems," *IEEE Communications Magazine*, pp. 88-93 (Feb. 2010).
Pedersen et al., "Carrier Aggregation for LTE-Advanced: Functionality and Performance Aspects," IEEE Communications Magazine, vol. 49, No. 6, pp. 89-95, (Jun. 1, 2011).
Noh, et al., "Channel Selection and Management for 11ac," Doc. No. IEEE 802.11-10/0593r1, *The Institute of Electrical and Electronics Engineers, Inc.*, pp. 1-21 (May 20, 2010).
Redieteab, et al., "Cross-Layer Multichannel Aggregation for Future WLAN Systems," 2010 IEEE Int'l Conf. on Communication Systems (ICCS), pp. 740-756 (Nov. 2010).
Park, "IEEE 802.11ac: Dynamic Bandwidth Channel Access," 2011 IEEE Int'l Conf. on Communications (ICC), pp. 1-5 (Jun. 2011).
Liu, et al., "VHT BSS Channel Selection," *Institute of Electrical and Electronics Engineers, Inc.*, doc. No. IEEE 802.11-11/1433r0, pp. 1-10 (Nov. 2011).
Wannstrom, "Carrier Aggregation explained," pp. 1-6 (May 2012).
Liu, et al, "Methods and Apparatus for Clear Channel Assessment," U.S. Appl. No. 13/034,421, filed Feb. 24, 2011 (47 pages).
Liu, et al, "Accessing Channels in a Multi-Channel Communication System," U.S. Appl. No. 13/440,214, filed Apr. 5, 2012 (38 pages).
"Technical White Paper: Long Term Evolution (LTE): A Technical Overview", Motorola, 15 pages (2007).
3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", 44 pages (Dec. 2011).
3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", 42 pages (Dec. 2010).
3GPP TS 23.203 V10.6.0, "3rd Generation Partnership Project; Technical Specification Group Services and System Aspects; Policy and Charging Control Architecture (Release 10)", 131 pages (Mar. 2012).
3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", 297 pages (Dec. 2010).
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", 101 pages (Dec. 2011).
3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), 125 pages (Dec. 2011).
3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), 125 pages (Mar. 2012).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 149 pages (Mar. 2010).
3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 194 pages (Mar. 2012).
3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", 32 pages (Dec. 2010).
3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", 296 pages (Dec. 2011).
Eastlake et al., "Trill: Fine-Grained Labeling," Internet-Draft, 21 pages (Dec. 8, 2011).
IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).
IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*, pp. 1-201 (2009).
IEEE Std 802.16j (Amendment to IEEE Std 802.16-2009), "IEEE Standard for Local and metropolitan area networks: Part 16: Air Interface for Broadband Wireless Access Systems—Amendment 1: Multihop Relay Specification," *The Institute of Electrical and Electronics Engineers, Inc.*, pp. 1-315 (Jun. 12, 2009).
Invitation to Pay Additional Fees and Partial International Search Report in International Application No. PCT/US2014/067713, dated Apr. 23, 2015 (6 pages).
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core

(56) References Cited

OTHER PUBLICATIONS

System Package [Controller Volume]", pp. 1-814; vol. 4, "Core System Package [Host Volume]," pp. 1-250, (Nov. 4, 2004).
International Search Report and Written Opinion in International Application No. PCT/US2014/067713, dated Jun. 30, 2015.
IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
International Preliminary Report on Patentability in International Application No. PCT/US2014/067713, dated Jun. 9, 2016 (18 pages).

\* cited by examiner

COEXISTENCE TECHNIQUES FOR WIDE AREA NETWORK DEVICES OPERATING IN UNLICENSED BANDS

CROSS-REFERENCES TO RELATED APPLICATIONS

This disclosure claims the benefit of U.S. Provisional Patent Application No. 61/908,997, filed on Nov. 26, 2013, which is incorporated herein by reference in its entirety.

FIELD OF THE DISCLOSURE

The present disclosure relates generally to communication networks and, more particularly, to techniques to facilitate coexistence between different wireless communication networks.

BACKGROUND

Mobile wireless communication service providers operate using radio frequency (RF) spectrum allocated by and licensed by government regulatory agencies such as, in the United States, the Federal Communication Commission (FCC). For example, the FCC allocates/licenses the following bands (in units of mega Hertz (MHz)) for wide area wireless communication services: 698-894, 1710-1755, 1850-1910, 1930-1990, 2110-2155, and 2496-2690. Other frequency bands are allocated/licensed by government agencies for other uses such as broadcast television, broadcast frequency modulation (FM) radio, etc. To use any of these frequency bands, an operator must obtain a license from the appropriate government regulatory agency and agree to use the frequency bands for the designated purpose. Such frequency bands are referred to herein as "licensed frequency bands" or "licensed bands."

The $3^{rd}$ Generation Partnership Project (3GPP) defines standards for mobile telephone communication protocols for systems deployed in the licensed bands, such as the High-Speed Packet Access (HSPA) standard, the Evolved High-Speed Packet Access (HSPA+) standard, and the Long Term Evolution (LTE) standard. Similarly, the IEEE 802.16e Standard defines communication protocols for mobile telephone communication systems that are to be deployed in the licensed bands. HSPA+, LTE, and the IEEE 802.16e Standard are examples of wireless wide area network (WAN) communication protocols.

Other frequency bands are allocated by government agencies for use by the general public and do not require a license from the government (but the government typically places use restrictions such as a maximum transmission power). For example, wireless local area networks, such as those operating according to a communication protocol defined by the IEEE 802.11 Standard, generally operate in the following bands (in units of MHz): 2400-2500 and 5240-5825. Such frequency bands are referred to herein as "unlicensed frequency bands" or "unlicensed bands."

SUMMARY

In an embodiment, a method is implemented by a communication device that is configured to operate in a first wireless communication network that utilizes a communication protocol developed for use in frequency bands that are licensed by a government entity for wireless communication applications. The method includes: determining, at the communication device, whether one or more communication channels in an unlicensed frequency band are not being utilized by any second wireless communication networks, wherein the government entity does not require licenses to use the unlicensed frequency band; in response to determining that one or more communication channels in the unlicensed frequency band are not being utilized by any second wireless communication networks, selecting, at the communication device, a set of one or more communication channels in the one or more communication channels for use by the first wireless communication network; and utilizing, at the communication device, the set of one or more communication channels for communications in the first wireless communication network.

In another embodiment, an apparatus, comprises a communication device comprising one or more integrated circuit devices configured to operate in a first wireless communication network that utilizes a communication protocol developed for use in frequency bands that are licensed by a government entity for wireless communication applications, determine whether one or more communication channels in an unlicensed frequency band are not being utilized by any second wireless communication networks, wherein the government entity does not require licenses to use the unlicensed frequency band, in response to determining that one or more communication channels in the unlicensed frequency band are not being utilized by any second wireless communication networks, select a set of one or more communication channels in the one or more communication channels for use by the first wireless communication network, and utilize the set of one or more communication channels for communications in the first wireless communication network.

In yet another embodiment, a method is implemented by a first communication device that is configured to operate in a first wireless communication network that utilizes a communication protocol developed for use in frequency bands that are licensed for communication applications by a government entity. The method includes scanning, at the first communication device, a plurality of communication channels in an unlicensed frequency band to determine whether one or more communication channels in the unlicensed frequency band are being utilized by any second communication networks, wherein the government entity does not require licenses to use the unlicensed frequency band; based on the scanning, generating, at the first communication device, channel availability information indicating whether one or more communication channels in the unlicensed frequency band are not being utilized by any second communication networks; generating, at the first communication device, one or more messages that include the channel availability information; and transmitting, from the first communication device, the one or messages to a second communication device in the first wireless communication network using the communication protocol developed for use in frequency bands that are licensed for communication applications.

In still another embodiment, an apparatus, comprises a communication device comprising one or more integrated circuit devices configured to operate in a first wireless communication network that utilizes a communication protocol developed for use in frequency bands that are licensed for communication applications by a government entity, scan a plurality of communication channels in an unlicensed frequency band to determine whether one or more communication channels in the unlicensed frequency band are being utilized by any second communication networks, wherein the government entity does not require licenses to use the unlicensed frequency band, based on scanning the plurality of communication channels in the unlicensed frequency band, generate channel availability information indicating whether one or more communication channels in the unlicensed frequency band are not being utilized by any second communication networks, generate one or more messages that include the channel availability information, and transmit the one or messages to a second communication device in the first wireless communication network using the communication protocol developed for use in frequency bands that are licensed for communication applications.

In another embodiment, a method is implemented by a communication device that is configured to operate in a first wireless communication network that utilizes a first communication protocol developed for use in frequency bands that are licensed for communication applications by a government entity, wherein the first wireless communication network is utilizing i) a first channel in an unlicensed frequency band as a primary channel and ii) a second channel in the unlicensed band as a secondary channel, and wherein the government entity does not require licenses to use the unlicensed frequency band. The method includes determining, at the communication device, that a second wireless communication network is utilizing or is attempting to utilize the first channel, wherein the second wireless communication network is utilizing a second communication protocol developed for use in the unlicensed band; and in response to determining that the second wireless communication network is utilizing or is attempting to utilize the first channel, at least one of i) utilizing, at the communication device, another channel in the unlicensed frequency band as the primary channel, or ii) not scheduling, at the communication device, communications with any other communication devices in the first wireless communication network on the first channel.

In yet another embodiment, an apparatus comprises a communication device comprising one or more integrated circuit devices configured to operate in a first wireless communication network that utilizes a first communication protocol developed for use in frequency bands that are licensed for communication applications by a government entity, utilize i) a first channel in an unlicensed frequency band as a primary channel and ii) a second channel in the unlicensed band as a secondary channel, and wherein the government entity does not require licenses to use the unlicensed frequency band, determine that a second wireless communication network is utilizing or is attempting to utilize the first channel, wherein the second wireless communication network is utilizing a second communication protocol developed for use in the unlicensed band, and in response to determining that the second wireless communication network is utilizing or is attempting to utilize the first channel, at least one of i) utilize another channel in the unlicensed frequency band as the primary channel, or ii) not schedule communications with any other communication devices in the first wireless communication network on the first channel.

In still another embodiment, a method is implemented by a communication device that is configured to operate in a first wireless communication network that utilizes a first communication protocol developed for use in frequency bands that are licensed for communication applications by a government entity. The method includes: generating, at the communication device, an announcement frame that conforms to a second communication protocol developed for use in unlicensed bands, wherein the government entity does not require licenses to use the unlicensed frequency band, and the announcement frame indicates use of a channel in the unlicensed band; transmitting, with the communication device, the announcement frame in the channel in the unlicensed band according to the second communication protocol; and communicating in the channel in the unlicensed band with one or more other communication devices in the first communication network according to the first communication protocol.

In another embodiment, an apparatus comprises a communication device having one or more integrated circuit devices configured to: operate in a first wireless communication network that utilizes a first communication protocol developed for use in frequency bands that are licensed for communication applications by a government entity, communicate in a channel in an unlicensed band with one or more other communication devices in the first wireless communication network according to the first communication protocol, wherein the government entity does not require licenses to use the unlicensed frequency band, generate an announcement frame that conforms to a second communication protocol developed for use in the unlicensed band, wherein the announcement frame indicates use of the channel in the unlicensed band, transmit the announcement frame in the channel in the unlicensed band according to the second communication protocol.

DETAILED DESCRIPTION

In embodiments described below, a wireless network device such as an evolved node base device (eNB) of a communication network transmits to and receives from one or more other wireless network devices, such as a user equipment device (UE), according to a communication protocol developed for use in frequency bands that are licensed for wireless communication applications (e.g., licensed bands). The communication network, however, operates in one or more unlicensed bands while using the communication protocol developed for use in licensed bands. Thus, the communication network utilizes techniques for coexisting with communication networks and devices that are known to operate in the one or more unlicensed bands, such as wireless local area networks (WLANs), personal area networks (PANs), etc., according to some embodiments. In other words, the communication network operates in one or more unlicensed bands using a communication protocol developed for use in licensed bands, and the communication network also utilizes techniques for coexisting with other communication networks and devices known to operate in unlicensed bands but not in the licensed bands for which the communication protocol was developed, according to some embodiments. In some embodiments, the communication protocol developed for use in licensed bands is a wireless wide area network (WAN) communication protocol.

eNB and UE correspond to terminology used in the 3$^{rd}$ Generation Partnership Project Long Term Evolution (3GPP LTE) Standard. The apparatus and methods discussed herein, however, are not limited to 3GPP LTE networks/devices. Rather, the apparatus and methods discussed herein may also be utilized in with wireless communication networks that utilize other suitable communication protocols (e.g., WAN communication protocols) developed for use in frequency bands that are licensed for wireless communication applications. For instance, other example systems that may utilize embodiments of apparatus and methods described herein are the High-Speed Packet Access (HSPA) standard and the Evolved High-Speed Packet Access (HSPA+) standard developed by 3GPP. As yet another example, another example system that may utilize embodiments of apparatus and methods described herein is a technology promulgated by the Worldwide Interoperability for Microwave Access (WiMAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. For ease of explanation, however, the description below refers to base stations (eNBs) and client stations (UEs).

Figure 1:
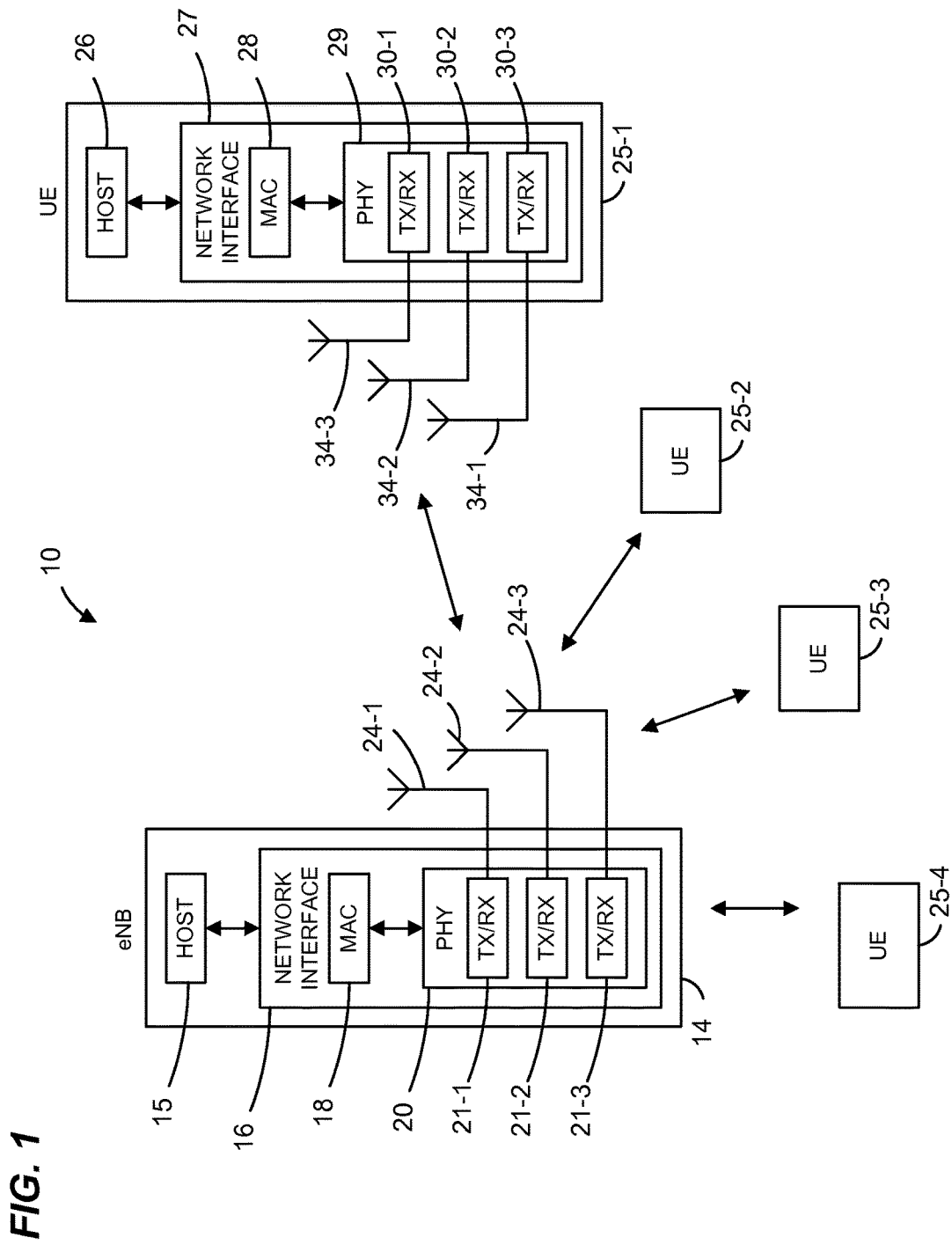
FIG. 1 is a block diagram of an example wireless communication network in which the wireless communication network utilizes a communication protocol developed for use in frequency bands that are licensed by a government entity for wireless communication applications, but operates in an unlicensed frequency band, wherein the government entity does not require licenses to use the unlicensed frequency band, according to an embodiment.

FIG. 1 is a block diagram of an example wireless communication network 10, according to an embodiment. An Evolved Node B (eNB) device 14, also referred to herein as a base station, includes a host processor 15 coupled to a network interface 16. The network interface 16 includes a medium access control layer (MAC) processing unit 18 and a physical layer (PHY) processing unit 20. The MAC processing unit 18 is configured to implement MAC functions defined by the communication protocol developed for use in frequency bands that are licensed for wireless communication applications (e.g., licensed bands). In various embodiments, the MAC processing unit 18 is configured to implement MAC functions defined by the LTE protocol, the HSPA protocol, the HSPA+ protocol, the WiMAX protocol, etc., or another suitable communication protocol developed for use in the licensed bands (e.g., a wireless WAN protocol). The PHY processing unit 20 is configured to implement PHY functions defined by the communication protocol developed for use the licensed bands. In various embodiments, the PHY processing unit 20 is configured to implement PHY functions defined by the LTE protocol, the HSPA protocol, the HSPA+ protocol, the WiMAX protocol, etc., or another suitable communication protocol developed for use in the licensed bands (e.g., a wireless WAN protocol).

The PHY processing unit 20 includes one or more transceivers 21, and the transceiver(s) 21 are coupled to one or more antennas 24. Although three transceivers 21 and three antennas 24 are illustrated in FIG. 1, the AP 14 can include different suitable numbers (e.g., 1, 2, 4, 5, etc.) of transceivers 21 and antennas 24 in other embodiments. The number of antennas 24 need not be the same as the number of transceivers 21. For example, in some embodiments, multiple transceivers 21 are coupled to the same antenna. Similarly, in some embodiments, there are more antennas 24 than transceivers 21 and antenna switching techniques are utilized. Additionally, in some embodiments, the base station 14 is configured to utilize antenna diversity, antenna beamforming, and/or multiple input, multiple output (MIMO) techniques such as spatial multiplexing.

The one or more transceivers 21 are configured to transmit/receive in one or more unlicensed bands. In some embodiments, the one or more transceivers 21 are also configured to transmit/receive in one or more licensed bands, e.g., the licensed bands in which the communication protocol was designed to operate. Thus, in some embodiments, the network interface 16 is configured to utilize the communication protocol developed for use the licensed bands in both licensed bands and unlicensed bands.

The network 10 includes a plurality of user equipment (UE) devices 25, also referred to herein as client stations. Although four client stations 25 are illustrated in FIG. 1, the network 10 can include different numbers (e.g., 1, 2, 4, 5, 6, etc.) of client stations 25 in various scenarios and embodiments.

The client station 25-1 includes a host processor 26 coupled to a network interface 27. The network interface 27 includes a MAC processing unit 28 and a PHY processing unit 29. The MAC processing unit 28 is configured to implement MAC functions defined by the communication protocol developed for use in the licensed bands. In various embodiments, the MAC processing unit 28 is configured to implement MAC functions defined by the LTE protocol, the HSPA protocol, the HSPA+ protocol, the WiMAX protocol, etc., or another suitable communication protocol developed for use in the licensed bands (e.g., a wireless WAN protocol). The PHY processing unit 29 is configured to implement PHY functions defined by the communication protocol developed for use the licensed bands. In various embodiments, the PHY processing unit 29 is configured to implement PHY functions defined by the LTE protocol, the HSPA protocol, the HSPA+ protocol, the WiMAX protocol, etc., or another suitable communication protocol developed for use in the licensed bands (e.g., a wireless WAN protocol).

The PHY processing unit 29 includes one or more transceivers 30, and the transceiver(s) 30 are coupled to a plurality of antennas 34. Although three transceivers 30 and three antennas 34 are illustrated in FIG. 1, the client station 25-1 can include different suitable numbers (e.g., 1, 2, 4, 5, etc.) of transceivers 30 and antennas 34 in other embodiments. The number of antennas 34 need not be the same as the number of transceivers 30. In some embodiments, multiple transceivers 30 are coupled to the same antenna. In some embodiments, there are more antennas 34 than transceivers 30 and antenna switching techniques are utilized. Additionally, in some embodiments, the client station 25-1 is configured to utilize antenna diversity, antenna beamforming, and/or a MIMO technique such as spatial multiplexing.

The one or more transceivers 30 are configured to transmit/receive in one or more unlicensed bands. In some embodiments, the one or more transceivers 30 are also configured to transmit/receive in one or more licensed bands, e.g., the licensed bands in which the communication protocol was designed to operate. Thus, in some embodiments, the network interface 27 is configured to utilize the communication protocol developed for use the licensed bands in both licensed bands and unlicensed bands.

In various embodiments, one or more of the client stations 25-2, 25-3, and 25-4 has a structure the same as or similar to the client station 25-1.

In some embodiments, the network 10 utilizes a wireless WAN communication protocol developed for use in licensed bands, but the network 10 operates in unlicensed bands in which other types of communication networks are known to operate, such as wireless local area networks (WLANs), personal area networks (PANs), etc. Thus, in some embodiments, the network interface 16 of the base station 14 and/or the network interface 27 of the client device 25 is configured to utilize techniques described below to coexist with communication networks developed for use in the unlicensed bands, such as WLAN communication protocols (e.g., defined by the IEEE 802.11 Standard), PAN protocols (e.g., the BLUETOOTH® communication protocol, the Zigbee protocol, etc.), etc. At the same time, the network interface 16 of the base station 14 and the network interface 27 of the client station 25 are configured to utilize, in the unlicensed band(s) a communication protocol developed for use in frequency bands that are licensed for wireless communication applications (e.g., LTE, HSPA, HSPA+, WiMAX, etc.).

In some embodiments, the host 15 of the base station 14 and/or the host 26 of the client station 25 is configured to implement, at least partially, techniques described below to coexist with communication networks developed for use in the unlicensed bands.

In some embodiments, the network interface 16 of the base station 14 and/or the network interface 27 of the client device 25 is also configured to communicate with one or more other communication networks (not shown) that utilize other types of communication protocols developed for use in the unlicensed bands, such as WLAN protocols (e.g., the IEEE 802.11 Standard protocol, etc.), PAN protocols (e.g., the BLUETOOTH® protocol, etc.), etc.

Figure 2A:
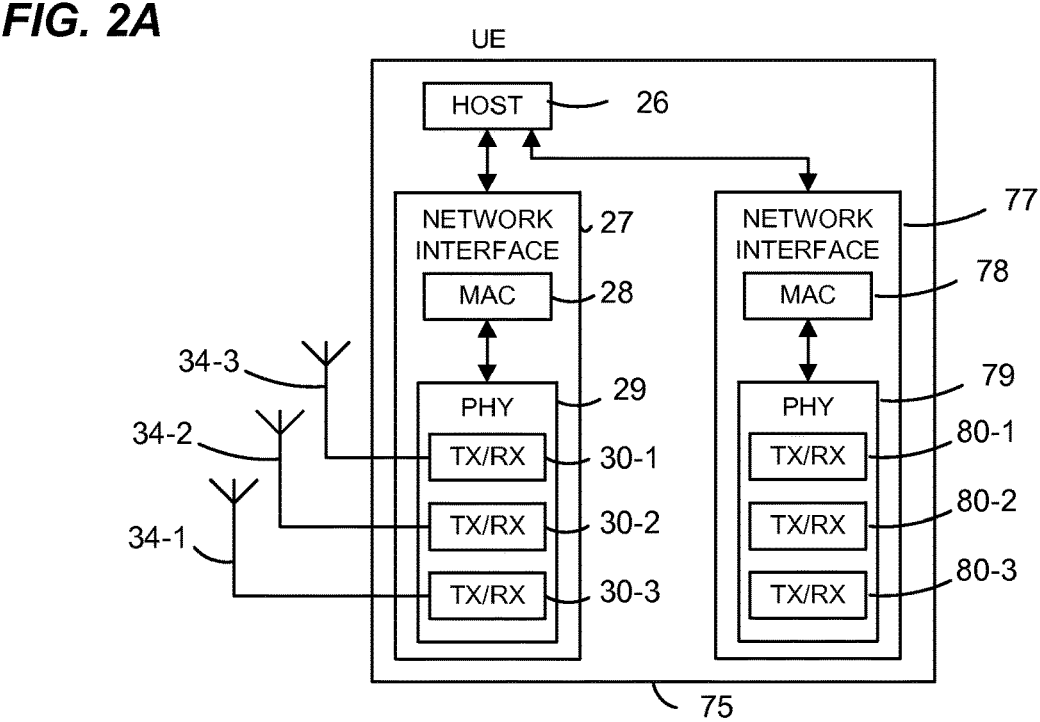
FIG. 2A is a block diagram of an example client station that operates in a wireless communication network such as the network illustrated in FIG. 1, according to an embodiment.

On the other hand, in some embodiments, the eNB 14 and/or the UE 25 includes an additional network interface configured to communicate with one or more other communication networks (not shown) that utilize other types of communication protocols developed for use in the unlicensed bands, such as WLAN protocols (e.g., an IEEE 802.11 Standard protocol, etc.), PAN protocols (e.g., the BLUETOOTH® protocol, etc.), etc. FIG. 2A is a block diagram of an example UE 75, according to an embodiment. The UE 75 includes the network interface device 27 of FIG. 1. The UE 75 also includes a network interface device 77 configured to communicate with a communication network (not shown) that utilizes a communication protocol developed for use in the unlicensed bands, such as a WLAN protocol (e.g., an IEEE 802.11 Standard protocol, etc.), a PAN protocol (e.g., the BLUETOOTH® protocol, etc.), etc. In an embodiment, the network interface 77 is coupled to the host processor 26. In other embodiments, the network interface 77 additionally or alternatively is coupled to the network interface 27.

The network interface 77 includes a MAC processing unit 78 and a PHY processing unit 79. The MAC processing unit 78 is configured to implement MAC functions defined by a communication protocol developed for use in the unlicensed bands. In various embodiments, the MAC processing unit 78 is configured to implement MAC functions defined by a WLAN protocol (e.g., an IEEE 802.11 Standard), a PAN protocol (e.g., the BLUETOOTH® Standard), etc. The PHY processing unit 79 is configured to implement PHY functions defined by the protocol developed for use in the unlicensed bands. In various embodiments, the PHY processing unit 79 is configured to implement PHY functions defined by a WLAN protocol (e.g., an IEEE 802.11 Standard), a PAN protocol (e.g., the BLUETOOTH® Standard), etc.

The PHY processing unit 79 includes one or more transceivers 80, and the transceiver(s) 80 are coupled to (coupling not shown to avoid obscuring components of the UE 75) one or more of the antennas 34. In an embodiment, an arbitration unit and/or switch (not shown) arbitrates between the network interface 27 and the network interface 77 for access to the one or more antennas 34. In other embodiments, the UE 75 includes a second set of one or more antennas (not shown) coupled to the one or more transceivers 80. Although three transceivers 80 and three antennas 34 are illustrated in FIG. 1, the UE 75 can include different numbers (e.g., 1, 2, 4, 5, etc.) of transceivers 80 and antennas 34 in other embodiments. The number of antennas 34 need not be the same as the number of transceivers 80. In some embodiments, multiple transceivers 80 are coupled to the same antenna. In some embodiments, there are more antennas than transceivers 80 and antenna switching techniques are utilized. Additionally, in some embodiments, the UE 75 is configured to utilize antenna diversity, antenna beamforming, and/or a MIMO technique such as spatial multiplexing.

The one or more transceivers 80 are configured to transmit/receive in one or more unlicensed bands.

Although FIG. 2A illustrates a UE 75 with two network interfaces, in some embodiments, the eNB 14 (FIG. 1) similarly includes a network interface such as the network interface 77. Thus, in some embodiments, the eNB 14 (FIG. 1) has a structure similar to that of the UE 75 of FIG. 2A.

Figure 2B:
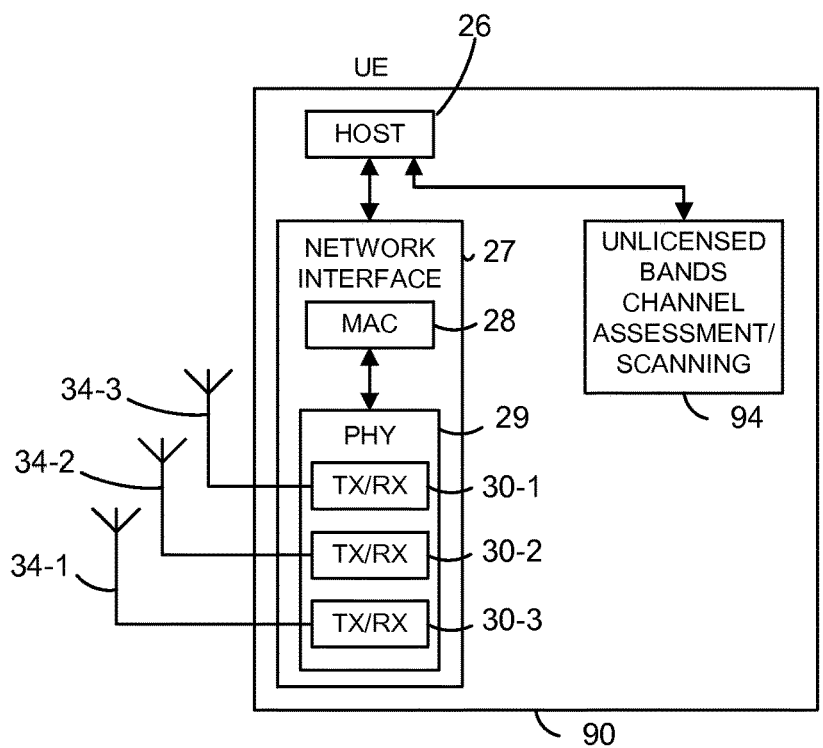
FIG. 2B is a block diagram of another example client station that operates in a wireless communication network such as the network illustrated in FIG. 1, according to another embodiment.

On the other hand, in some embodiments, the eNB 14 and/or the UE 25 includes an channel assessment/scanning device configured to perform certain channel assessment (e.g., clear channel assessment) and/or channel scanning functions defined by (or utilized by devices configured to operate according to) a communication protocol developed for use in the unlicensed bands, such as WLAN protocols (e.g., an IEEE 802.11 Standard protocol, etc.), PAN protocols (e.g., the BLUETOOTH® protocol, etc.), etc. FIG. 2B is a block diagram of an example UE 90, according to an embodiment. The UE 90 includes the network interface device 27 of FIG. 1. The UE 90 also includes a channel assessment/scanning unit 94. The channel assessment/scanning unit 94 is configured to perform channel assessment (e.g., clear channel assessment) and/or channel scanning functions defined by (or utilized by devices configured to operate according to) a communication protocol developed for use in the unlicensed bands, such as WLAN protocols (e.g., an IEEE 802.11 Standard protocol, etc.), PAN protocols (e.g., the BLUETOOTH® protocol, etc.), etc. For example, in an embodiment, the channel assessment/scanning unit 94 is configured to perform channel assessment (e.g., clear channel assessment) and/or channel scanning functions defined by (or utilized by devices configured to operate according to) one or more of an IEEE 802.11 Standard protocol, the BLUETOOTH® protocol, etc. In an embodiment, the channel assessment/scanning unit 94 is coupled to the host processor 26. In other embodiments, the channel assessment/scanning unit 94 additionally or alternatively is coupled to the network interface 27.

Although FIG. 2B illustrates a UE 90 with the channel assessment/scanning unit 94, in some embodiments, the eNB 14 (FIG. 1) similarly includes a channel assessment/scanning device such as the channel assessment/scanning unit 94. Thus, in some embodiments, the eNB 14 (FIG. 1) has a structure similar to that of the UE 90 of FIG. 2B.

Figure 3:
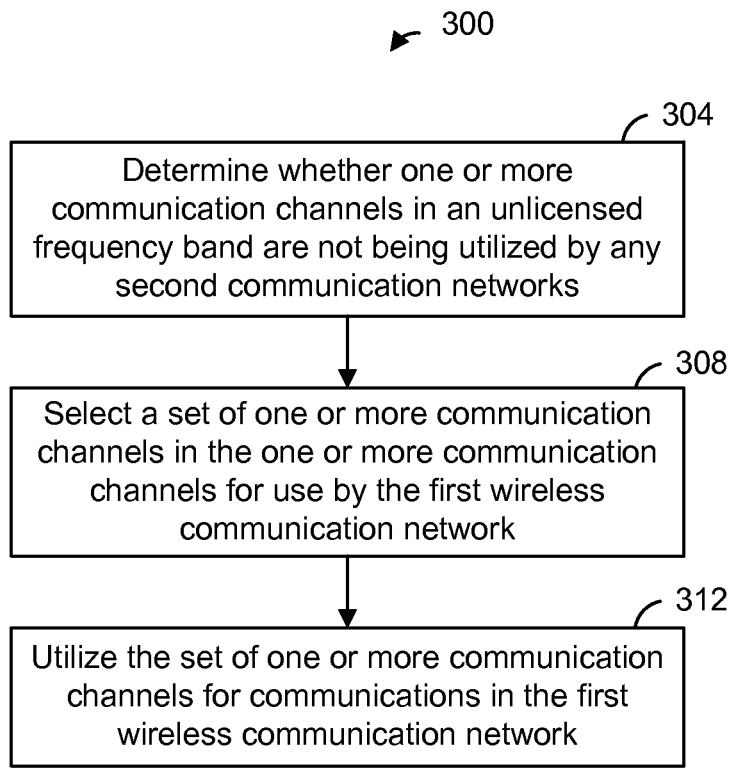
FIG. 3 is a flow diagram of an example method for selecting and using a communication channel in an unlicensed frequency band for use by a wireless communication network that utilizes a communication protocol developed for use in frequency bands that are licensed for wireless communication applications, according to an embodiment.

FIG. 3 is a flow diagram of an example method 300 for selecting and using a communication channel in an unlicensed frequency band for use by a first wireless communication network that utilizes a communication protocol developed for use in frequency bands that are licensed for wireless communication applications, according to an embodiment. The method 300 is implemented by the base station 14, according to an embodiment. For example, the method 300 is implemented at least partially by the network interface 16, in an embodiment. In an embodiment, the method 300 is also implemented partially by the host processor 15. Merely for explanatory purposes, the method 300 is described with reference to FIG. 1. In other embodiments, however, the method 300 is implemented by another suitable communication device and/or in another suitable network other than the base station 14 and/or the network 10.

At block 304, it is determined whether one or more communication channels in the unlicensed frequency band are not being utilized by any second wireless communication networks that utilize protocols designed for use in the unlicensed frequency band. For example, in an embodiment, the first communication network utilizes a wireless WAN protocol (e.g., LTE, HSPA, HSPA+, WiMAX, etc.) and the second communication networks utilize a WLAN protocol, a PAN protocol, etc.

In an embodiment, block 304 is implemented at a first communication device in the first communication network, and block 304 comprises utilizing, at the first communication device, channel assessment and/or channel scanning techniques defined by (and/or utilized by devices configured to operate according to) a second communication protocol designed for use in the unlicensed frequency band. For example, in an embodiment, the first communication device includes a second network interface device configured to operate according to the second communication protocol (e.g., as in FIG. 2A). The first communication device utilizes the second network interface device to perform channel assessment and/or channel scanning techniques defined by (and/or utilized by devices configured to operate according to) the second communication protocol in order to determine whether one or more communication channels in the unlicensed frequency band are not being utilized by any second wireless communication networks that utilize the second communication protocol.

As another example, in an embodiment, the first communication device includes a channel assessment and/or scanning unit configured to perform channel assessment and/or channel scanning techniques defined by (and/or utilized by devices configured to operate according to) the second communication protocol (e.g., as in FIG. 2B) in order to determine whether one or more communication channels in the unlicensed frequency band are not being utilized by any second wireless communication networks that utilize the second communication protocol.

In yet another example, a second communication device in the first communication network includes a second network interface device configured to operate according to the second communication protocol (e.g., as in FIG. 2A). The second communication device utilizes the second network interface device to perform channel assessment and/or channel scanning techniques defined by (and/or utilized by devices configured to operate according to) the second communication protocol in order to determine whether one or more communication channels in the unlicensed frequency band are not being utilized by any second wireless communication networks that utilize the second communication protocol. Then, the second communication device transmits one or more messages to the first communication device, using the first communication protocol, indicating whether one or more communication channels in the unlicensed frequency band are not being utilized by any second wireless communication networks that utilize the second communication protocol. Then, the first communication device utilizes the one or more messages received from the second communication device to determine, at the first communication device, whether one or more communication channels in the unlicensed frequency band are not being utilized by any second wireless communication networks that utilize the second communication protocol.

In still another example, in an embodiment, a second communication device in the first communication network includes a channel assessment and/or scanning unit configured to perform channel assessment and/or channel scanning techniques defined by (and/or utilized by devices configured to operate according to) the second communication protocol (e.g., as in FIG. 2B) in order to determine whether one or more communication channels in the unlicensed frequency band are not being utilized by any second wireless communication networks that utilize the second communication protocol. The second communication device utilizes the channel assessment and/or scanning unit to perform channel assessment and/or channel scanning techniques defined by (and/or utilized by devices configured to operate according to) the second communication protocol in order to determine whether one or more communication channels in the unlicensed frequency band are not being utilized by any second wireless communication networks that utilize the second communication protocol. Then, the second communication device transmits one or more messages to the first communication device, using the first communication protocol, indicating whether one or more communication channels in the unlicensed frequency band are not being utilized by any second wireless communication networks that utilize the second communication protocol. Then, the first communication device utilizes the one or more messages received from the second communication device to determine, at the first communication device, whether one or more communication channels in the unlicensed frequency band are not being utilized by any second wireless communication networks that utilize the second communication protocol.

At block 308, in response to determining that one or more communication channels in the unlicensed frequency band are not being utilized by any second wireless communication networks (block 304), a set of one or more communication channels in the one or more communication channels is selected for use by the first wireless communication network. For example, the network interface 16 selects the set of one or more communication channels for use by the first wireless communication network, in an embodiment. As another example, the host processor 15 selects the set of one or more communication channels for use by the first wireless communication network, in an embodiment.

At block 312, the set of one or more communication channels selected at block 308 is utilized for communications in the first wireless communication network. For example, the network interface 16 utilizes the set of one or more communication channels selected at block 308 is utilized for communications in the first wireless communication network. In some embodiments, the network interface 16 of the base station 14 instructs one or more client devices 25 in the first wireless communication network 10 to utilize the set of one or more communication channels selected at block 308.

In some embodiments, the method 300 is repeated to update the set of one or more communication channels utilized at block 312. For example, if it is subsequently determined that one of the communication channels previously selected at block 308 is now being utilized by a second communication network, that one communication channel is deselected and the first communication network stops utilizing deselected communication channel, according to an embodiment. Similarly, if it is subsequently determined that a new communication channel that was previously being utilized by a second communication network is no longer being utilized by any second communication network, that new communication channel may be selected and the first communication network may start utilizing the new communication channel, according to an embodiment.

Figure 4:
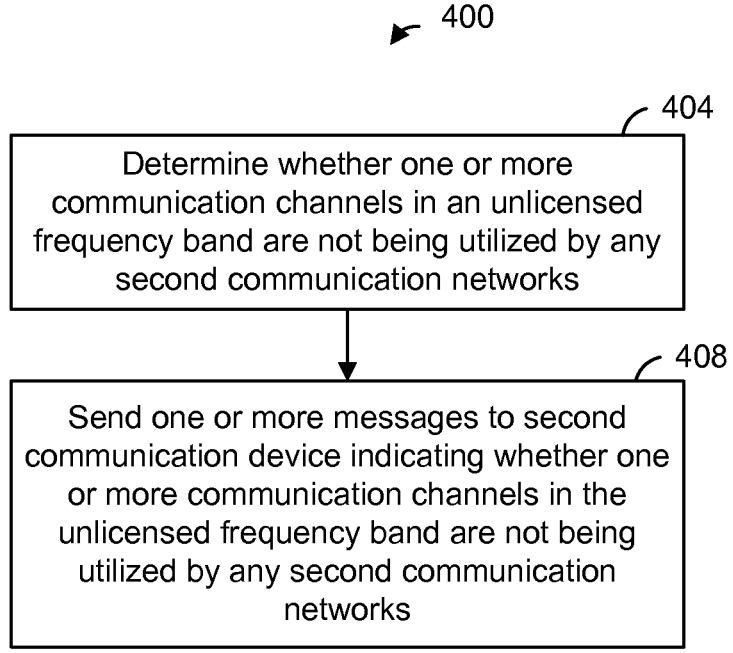
FIG. 4 is a flow diagram of an example method for informing a communication device, which operates in a first wireless communication network that utilizes a first communication protocol developed for use in frequency bands that are licensed for wireless communication applications, of whether a channel in an unlicensed frequency band is being used by any second communication networks that utilize a second communication protocol developed for use in unlicensed frequency bands, according to an embodiment.

FIG. 4 is a flow diagram of an example method 400 for determining whether a communication channel in an unlicensed frequency band can be utilized by a first wireless communication network that utilizes a communication protocol developed for use in frequency bands that are licensed for wireless communication applications, according to an embodiment. The method 400 is implemented by the client device 25 (FIG. 1), the client device 75 (FIG. 2A), or the client device 90 (FIG. 2B), according to various embodiments. For example, the method 400 is implemented at least partially by the network interface 27, in an embodiment. In an embodiment, the method 400 is also implemented partially by the host processor 26. In some embodiment, the method 400 is also implemented partially by the network interface 77 or the channel assessment/scanning unit 94. Merely for explanatory purposes, the method 400 is described with reference to FIGS. 1, 2A, and 2B. In other embodiments, however, the method 400 is implemented by another suitable communication device and/or in another suitable network other than the client devices 25, 75, 90 and/or the network 10.

At block 404, it is determined whether one or more communication channels in the unlicensed frequency band are not being utilized by any second wireless communication networks that utilize protocols designed for use in the unlicensed frequency band. For example, in an embodiment, the first communication network utilizes a wireless WAN protocol (e.g., LTE, HSPA, HSPA+, WiMAX, etc.) and the second communication networks utilize a WLAN protocol, a PAN protocol, etc.

In an embodiment, block 404 is implemented at a client device in the first communication network, and block 404 comprises utilizing, at the client device, channel assessment and/or channel scanning techniques defined by (and/or utilized by devices configured to operate according to) a second communication protocol designed for use in the unlicensed frequency band. For example, in an embodiment, the client device includes a second network interface device configured to operate according to the second communication protocol (e.g., as in FIG. 2A). The client device utilizes the second network interface device to perform channel assessment and/or channel scanning techniques defined by (and/or utilized by devices configured to operate according to) the second communication protocol in order to determine whether one or more communication channels in the unlicensed frequency band are not being utilized by any second wireless communication networks that utilize the second communication protocol.

As another example, in an embodiment, the client device includes a channel assessment and/or scanning unit configured to perform channel assessment and/or channel scanning techniques defined by (and/or utilized by devices configured to operate according to) the second communication protocol (e.g., as in FIG. 2B) in order to determine whether one or more communication channels in the unlicensed frequency band are not being utilized by any second wireless communication networks that utilize the second communication protocol.

At block 408, the client device transmits one or more messages to a base station, using the first communication protocol, indicating whether one or more communication channels in the unlicensed frequency band are not being utilized by any second wireless communication networks that utilize the second communication protocol.

In some embodiments, the method 400 is repeated to facilitate updating a set of one or more communication channels in the unlicensed band that are utilized by the first communication network. For example, if it is subsequently determined that one of the communication channels previously identified at block 404 as not being utilized is now being utilized by a second communication network, the client station transmits one or more messages to the base station to inform the base station that the previously identified channel is now being utilized by a second communication network, in an embodiment. Similarly, if it is subsequently determined that a new communication channel that was previously being utilized by a second communication network is no longer being utilized by any second communication network, the client station transmits one or more messages to the base station to inform the base station of the new communication channel that is no longer being utilized by any second communication network, according to an embodiment.

Figure 5:
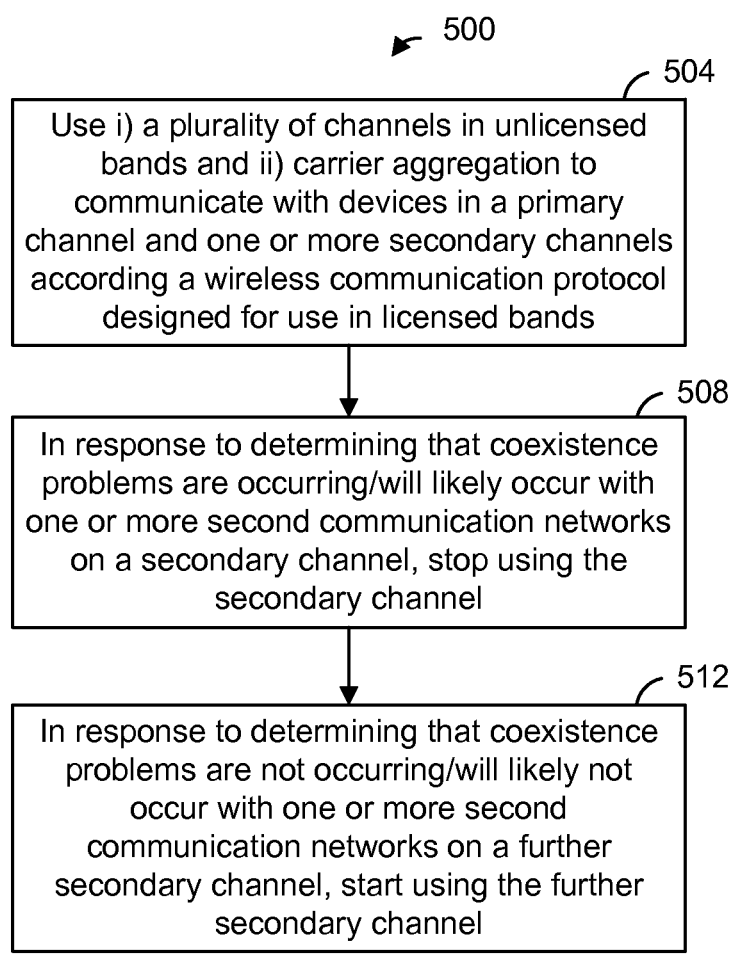
FIG. 5 is a flow diagram of an example method, in a wireless communication network that utilizes a communication protocol developed for use in frequency bands that are licensed for wireless communication applications, for selecting and using a communication channel in an unlicensed frequency band, according to an embodiment.

FIG. 5 is a flow diagram of an example method 500 for selecting and using communication channels in an unlicensed frequency band for use by a first wireless communication network that utilizes a communication protocol developed for use in frequency bands that are licensed for wireless communication applications and that utilizes channel aggregation, according to an embodiment. The method 500 is implemented by the base station 14, according to an embodiment. For example, the method 500 is implemented at least partially by the network interface 16, in an embodiment. In an embodiment, the method 500 is also implemented partially by the host processor 15. Merely for explanatory purposes, the method 500 is described with reference to FIG. 1. In other embodiments, however, the method 500 is implemented by another suitable communication device and/or in another suitable network other than the base station 14 and/or the network 10.

At block 504, a base station utilizes a plurality of channels in one or more unlicensed bands for communicating with one or more client devices according to a protocol developed for licensed bands. Block 504 includes utilizing channel aggregation, sometimes referred to herein as carrier aggregation, where utilized channel aggregation techniques are defined by the protocol developed for the licensed bands. For example, in an embodiment, the base station utilizes a primary channel and one or more secondary channels to communicate with a client device according to the protocol developed for the licensed bands. In some embodiments, the plurality of channels utilized at block 504 is determined using techniques such as described above with respect to FIG. 3. In other embodiments, however, other suitable techniques for determining the plurality of channels are utilized.

At block 508, in response to determining that coexistence problems are occurring or will likely occur with one or more second communication networks on a secondary channel being utilized for communicating with a client device in the first wireless communication network, the base station stops using and/or does not use the secondary channel when communicating with the client device in the first wireless communication network. In an embodiment, determining that coexistence problems with one or more second communication networks on the first secondary channel are occurring or will likely occur comprises determining that a second communication network is utilizing the first secondary channel using techniques such as described above with reference to FIG. 3. In other embodiments, other suitable techniques for determining that coexistence problems with one or more second communication networks on the first secondary channel are occurring or will likely occur are utilized.

In some embodiments, block 508 comprises deactivating a secondary channel for communication with the client device in response to determining that coexistence problems are occurring or will likely occur with the secondary channel. In some embodiments, block 508 comprises not scheduling the client device for communications on a secondary channel in response to determining that coexistence problems are occurring or will likely occur with the secondary channel.

At block 512, in response to determining that coexistence problems with one or more second communication networks on a further secondary channel are not occurring or will likely not occur when communicating with a client device in the first wireless communication network, the base station starts using and/or uses the further secondary channel when communicating with the client device in the first wireless communication network. In an embodiment, determining that coexistence problems with one or more second communication networks on the further secondary channel will not occur or will likely not occur comprises determining that no second communication network is utilizing the further secondary channel using techniques such as described above with reference to FIG. 3. In other embodiments, other suitable techniques for determining that coexistence problems with one or more second communication networks on the further secondary channel are not occurring or will likely not occur are utilized.

In some embodiments, block 512 comprises activating a further secondary channel for communication with the client device in response to determining that coexistence problems are occurring or will likely occur with the secondary channel. In some embodiments, block 508 comprises not scheduling the client device for communications on a secondary channel in response to determining that coexistence problems are occurring or will likely occur with the secondary channel.

In some embodiments, the base station 14 uses primary carrier signaling to activate and deactivate secondary channels. In some embodiments, the base station 14 uses primary carrier signaling to schedule communications on secondary channels.

In some embodiments, at least a portion of the method 500 is combined with at least a portion of the method 300. For example, in an embodiment, the method 300 is utilized to determine a set of multiple channels that are to be utilized, at block 504, as the primary channel and the one or more secondary channels.

In some scenarios in which the first communication network (developed for use in licensed bands) is utilizing channel aggregation and in which a primary channel and one or more secondary channels (in the unlicensed bands) are being utilized, a second communication network (developed for use in unlicensed bands) may start or resume using a channel that coincides with and/or overlaps with the primary channel of the first communication network. Thus, embodiments of techniques for the first communication network handling such scenarios are described below.

Figure 6:
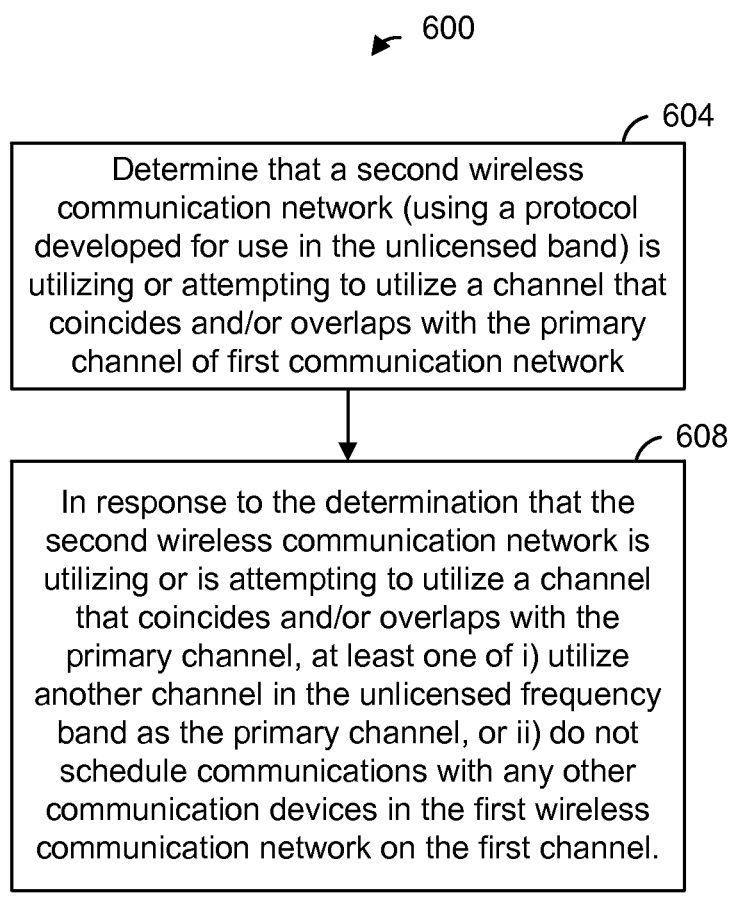
FIG. 6 is a flow diagram of an example method, in a first wireless communication network that utilizes a first communication protocol developed for use in frequency bands that are licensed for wireless communication applications, for mitigating coexistence problems resulting from utilizing a channel in an unlicensed band, according to an embodiment.

FIG. 6 is a flow diagram of an example method 600 for handling a scenario in which a first communication network (developed for use in licensed bands) is utilizing channel aggregation and in which a primary channel and one or more secondary channels (in the unlicensed bands) are being utilized, a second communication network (developed for use in unlicensed bands) may start or resume using a channel that coincides with and/or overlaps with the primary channel of the first communication network, according to an embodiment. The method 600 is implemented by the base station 14, according to an embodiment. For example, the method 600 is implemented at least partially by the network interface 16, in an embodiment. In an embodiment, the method 600 is also implemented partially by the host processor 15. Merely for explanatory purposes, the method 600 is described with reference to FIG. 1. In other embodiments, however, the method 600 is implemented by another suitable communication device and/or in another suitable network other than the base station 14 and/or the network 10.

In the method 600, a first wireless communication network is utilizing a communication protocol developed for use in frequency bands that are licensed for communication uses, and the first wireless communication network is utilizing i) a first channel in an unlicensed frequency band as a primary channel and ii) a second channel in the unlicensed band as a secondary channel.

At block 604, it is determined that a second wireless communication network is utilizing or is attempting to utilize a channel that coincides and/or overlaps with the primary channel, where the second communication network is using a communication protocol developed for use in unlicensed frequency bands. For example, in an embodiment, the base station 14 determines that a second wireless communication network is utilizing or is attempting to utilize channel that coincides and/or overlaps with the primary channel. In some embodiments, the base station 14 determines that coexistence problems with one or more second communication networks will occur or will likely occur when communicating with one or more client devices in the first wireless communication network via the primary channel.

At block 608, in response to determining that the second wireless communication network is utilizing or is attempting to utilize a channel that coincides and/or overlaps with the primary channel, at least one of i) another channel in the unlicensed frequency band is utilized as the primary channel, or ii) communications with any other communication devices in the first wireless communication network are not scheduled on the first channel. For example, in an embodiment, the base station 14 i) utilizes another channel in the unlicensed frequency band as the primary channel, and/or ii) does not schedule communications with any other communication devices in the first wireless communication network on the first channel.

In some embodiments, block 608 comprises quieting the primary channel and sending information that is normally sent over the primary channel over a secondary channel. For example, in an embodiment, the base station 4 broadcasts system information on both the primary channel and the secondary channel to facilitate quieting the primary channel in response to determining that the second wireless communication network is utilizing or is attempting to utilize a channel that coincides and/or overlaps with the primary channel. In an embodiment, the base station 14 maintains a radio resource control (RCC) connection on both the primary channel and the secondary channel to facilitate quieting the primary channel in response to determining that the second wireless communication network is utilizing or is attempting to utilize a channel that coincides and/or overlaps with the primary channel.

In some embodiments, block 608 includes switching the primary channel to the second channel, and switching the secondary channel to the first channel. For example, in some embodiments, the base station 14 switches the primary channel to the second channel, and switches the secondary channel to the first channel, in an embodiment. In some embodiments, the primary channel is switched to the second channel and the secondary channel is switched to the first channel only when it is determined that coexistence problems with one or more second communication networks will not occur or will likely not occur when communicating with one or more client devices in the first wireless communication network via the second channel.

In some embodiments, block 608 comprises restart a communication device to cause the communication device to utilize another channel in the unlicensed frequency band, different than the first channel, as the primary channel. For example, in some embodiments, the base station 14 restarts to cause the base station to utilize another channel in the unlicensed frequency band, different than the first channel, as the primary channel. In some embodiments, the base station 14 determines a new channel in the unlicensed band to utilize as the primary channel, stores an indication of the new channel in a memory device of the base station 14, and then restarts. In an embodiment, upon restart or after restarting, the base station 14 uses the indication of the new channel stored in the memory device to select the new channel as the primary channel.

In some embodiments, block 608 comprises handing over a client device to another cell that utilizes another channel in the unlicensed frequency band, different than the first channel, as a primary channel of the other cell. For example, in an embodiment, the base station 14 hands over the client device to the other cell. In some embodiments, the base station 14 is the base station of the other cell. In some embodiments, another base station separate from the base station 14 is the base station of the other cell.

In some scenarios in which the first communication network (developed for use in licensed bands) is utilizing channel aggregation and in which a primary channel and one or more secondary channels (in the unlicensed bands) are being utilized, a second communication network (developed for use in unlicensed bands) may start or resume using a channel that coincides with and/or overlaps with the primary channel of the first communication network. Thus, embodiments of techniques for the first communication network handling such scenarios are described below.

Figure 7:
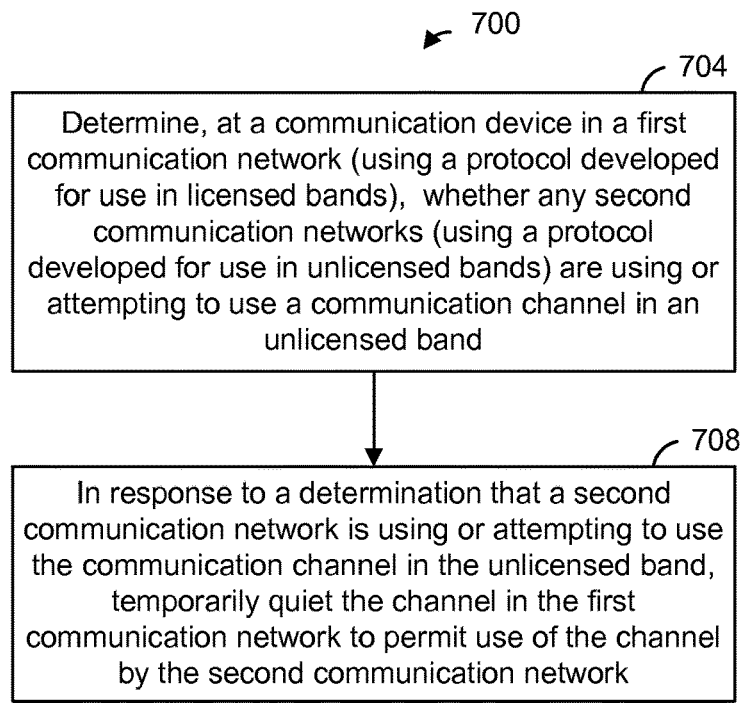
FIG. 7 is a flow diagram of another example method, in a first wireless communication network that utilizes a first communication protocol developed for use in frequency bands that are licensed for wireless communication applications, for mitigating coexistence problems resulting from utilizing a channel in an unlicensed band, according to another embodiment.

FIG. 7 is a flow diagram of an example method 700 for a first communication network (using a first communication protocol developed for use in licensed bands) that is utilizing a channel in an unlicensed band to yield the channel to a second communication network (developed for use in unlicensed bands), according to an embodiment. The method 700 is implemented by the base station 14, according to an embodiment. For example, the method 700 is implemented at least partially by the network interface 16, in an embodiment. In an embodiment, the method 700 is also implemented partially by the host processor 15. Merely for explanatory purposes, the method 700 is described with reference to FIG. 1. In other embodiments, however, the method 700 is implemented by another suitable communication device and/or in another suitable network other than the base station 14 and/or the network 10.

In the method 700, a first wireless communication network is utilizing a communication protocol developed for use in frequency bands that are licensed for communication uses, and the first wireless communication network is utilizing one or more channels in the unlicensed band.

At block 704, it is determined whether any second wireless communication networks are utilizing or are attempting to utilize the channel (e.g., attempting to use the same channel or another channel that coincides and/or overlaps with the channel), where the second communication networks are using one or more communication protocols developed for use in unlicensed frequency bands. For example, in an embodiment, the base station 14 determines that a second wireless communication network is utilizing or is attempting to utilize the channel. In some embodiments, the base station 14 determines that coexistence problems with one or more second communication networks will occur or will likely occur when communicating with one or more client devices in the first wireless communication network via the primary channel.

At block 708, in response to determining that a second wireless communication network is utilizing or is attempting to utilize the channel, a device in the first communication network temporarily quiets use of the channel by the first communication network to permit use of the channel by the second communication network. For example, in an embodiment, the base station 14, in response to determining that a second wireless communication network is utilizing or is attempting to utilize the channel, temporarily quiets use of the channel by the first communication network to permit use of the channel by the second communication network.

In some embodiments, block 708 comprises temporarily quieting the channel for a defined amount of time at regular intervals.

In an embodiment in which the first communication network utilizes an LTE communication protocol, block 708 includes generating and transmitting a multicast-broadcast single frequency network (MBSFN) subframe. In an embodiment in which the first communication network utilizes an LTE communication protocol, block 708 includes generating and transmitting an almost blank subframe (ABS).

In some embodiments, a first communication network for a first communication network which uses a first communication protocol (developed for use in licensed bands) announces use of a channel in an unlicensed band to any second communication networks which use a second communication protocol (developed for use in unlicensed bands). In some embodiments and/or scenarios, a second communication network, upon receiving the announcement, may choose to not use the channel or temporarily yield the channel to the first communication network.

Figure 8:
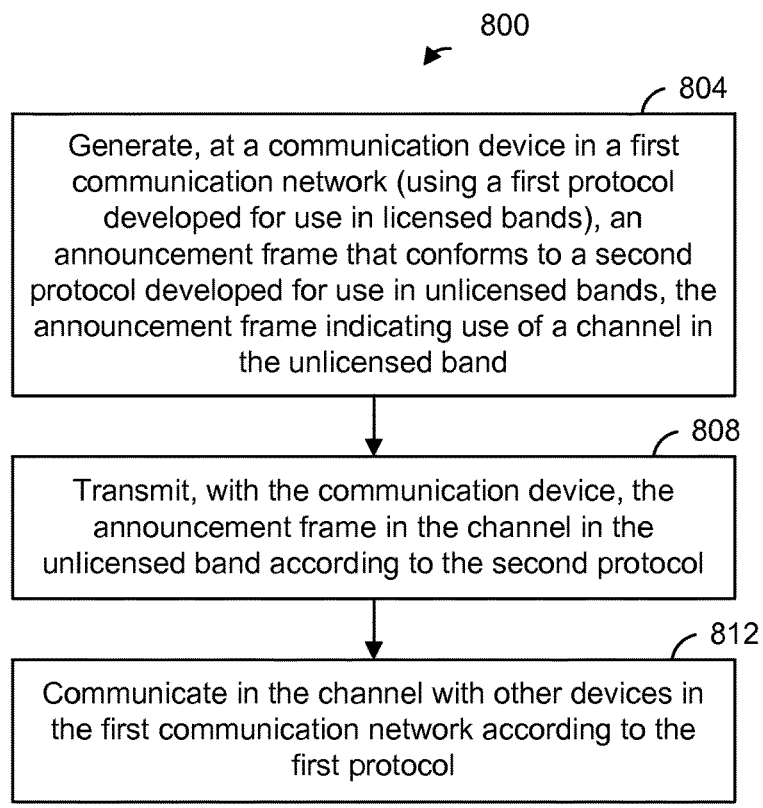
FIG. 8 is a flow diagram of another example method, in a first wireless communication network that utilizes a first communication protocol developed for use in frequency bands that are licensed for wireless communication applications, for mitigating coexistence problems resulting from utilizing a channel in an unlicensed band, according to another embodiment.

FIG. 8 is a flow diagram of an example method 800 for a first communication network (using a first communication protocol developed for use in licensed bands) to announce use of a channel in an unlicensed band to any second communication networks using a second communication protocol (developed for use in unlicensed bands), according to an embodiment. The method 800 is implemented by the base station 14, according to an embodiment. For example, the method 800 is implemented at least partially by the network interface 16, in an embodiment. In an embodiment, the method 800 is also implemented partially by the host processor 15. The method 800 is implemented by the client device 25 and/or the client device 75, according to some embodiments. For example, the method 800 is implemented at least partially by the network interface 27, in an embodiment. As another example, the method 800 is implemented at least partially by the network interface 77, in an embodiment. In some embodiments, the method 800 is also implemented partially by the host processor 26.

Merely for explanatory purposes, the method 800 is described with reference to FIGS. 1 and 2A. In other embodiments, however, the method 800 is implemented by other suitable communication devices and/or in another suitable network other than the base station 14, the client device 25, the client device 75, and/or the network 10.

In the method 800, a first wireless communication network is utilizing a first communication protocol developed for use in frequency bands that are licensed for communication uses, and the first wireless communication network is utilizing a channel in an unlicensed band.

At block 804, a first communication device in the first network generates an announcement frame that conforms to a second communication protocol developed for use in unlicensed bands. The announcement frame indicates use of a channel in the unlicensed band, in an embodiment. For example, in an embodiment, the announcement frame comprises a beacon frame that conforms to the second communication protocol (e.g., a beacon frame defined by a WLAN protocol, etc.). As another example, the announcement frame comprises a frame that conforms to the second communication protocol and that seeks to reserve the channel for a time period (e.g., a request-to-send (RTS) frame defined by a WLAN protocol, a clear-to-send (CTS) frame defined by a WLAN protocol, a CTS-to-self frame defined by a WLAN protocol, etc.).

At block 808, the first communication device transmits the announcement frame in the channel in the unlicensed band according to the second communication protocol.

In some embodiments, the first communication device is a base station such as the base station 14. For example, the base station 14 may include a second network interface configured to generate the announcement frame and transmit the announcement frame according to the second communication protocol. In some embodiments in which the first communication network utilizes an LTE protocol, the base station transmits the announcement frame during an MBSFN subframe. In some embodiments in which the first communication network utilizes an LTE protocol, the base station transmits the announcement frame during an ABS subframe.

In other embodiments, the first communication device is a client device such as the client device 25 or the client device 75. For example, the client device 75 may utilize the network interface 77 to generate the announcement frame and transmit the announcement frame according to the second communication protocol. In some embodiments in which the first communication device is a client device, the first communication device performs blocks 804 and 808 responsive to a request from a second communication device. For example, a base station (e.g., the base station 14) may request a client device (e.g., the client device 75) to perform blocks 804 and 808. In an embodiment, the second communication device periodically requests that the first communication device perform blocks 804 and 808. In an embodiment, the second communication device requests that the first communication device periodically perform blocks 804 and 808. In some embodiments in which the first communication network utilizes an LTE protocol, the client device is instructed to transmit, and transmits, the announcement frame during an MBSFN subframe. In some embodiments in which the first communication network utilizes an LTE protocol, the client device is instructed to transmit, and transmits, the announcement frame during an ABS subframe.

In some embodiments that utilize channel aggregation, with a first channel in the unlicensed band as a primary channel and a second channel in the unlicensed band as a secondary channel, the announcement frame is transmitted on the primary channel. In some embodiments that utilize channel aggregation, with a first channel in the unlicensed band as a primary channel and a second channel in the unlicensed band as a secondary channel, the announcement frame is transmitted on the secondary channel.

At block 812, the first communication device communicates in the channel in the unlicensed band with one or more other communication devices in the first wireless communication network according to the first communication protocol.

In an embodiment, a method is implemented by a communication device that is configured to operate in a first wireless communication network that utilizes a communication protocol developed for use in frequency bands that are licensed by a government entity for wireless communication applications. The method includes: determining, at the communication device, whether one or more communication channels in an unlicensed frequency band are not being utilized by any second wireless communication networks, wherein the government entity does not require licenses to use the unlicensed frequency band; in response to determining that one or more communication channels in the unlicensed frequency band are not being utilized by any second wireless communication networks, selecting, at the communication device, a set of one or more communication channels in the one or more communication channels for use by the first wireless communication network; and utilizing, at the communication device, the set of one or more communication channels for communications in the first wireless communication network.

In other embodiments, the method includes one of or any suitable combination of two or more of the following features.

Determining whether one or more communication channels in the unlicensed frequency band are not being utilized by any second wireless communication networks comprises scanning, at the communication device, a plurality of communication channels in a plurality of communication channels in the unlicensed frequency band to determine whether one or more communication channels in the unlicensed frequency band are being utilized by any second wireless communication networks.

The communication protocol is a first communication protocol; and scanning the plurality of communication channels comprises scanning the plurality of communication channels for signals that conform to a second communication protocol developed for use in unlicensed frequency bands.

The second communication protocol is one of i) a wireless local area network (WLAN) communication protocol, or ii) a personal area network (PAN) communication protocol.

The communication device is a first communication device; the method further comprises receiving, at the first communication device, one or more messages from one or more second communication devices operating in the first wireless communication network, the one or more messages including information indicating whether one or more communication channels in the unlicensed frequency band are not being utilized by any second communication networks; and determining whether one or more communication channels in the unlicensed frequency band are not being utilized by any second wireless communication networks comprises analyzing, at the first communication device, the information in the one or more messages.

The communication device is a first communication device; and the method comprises utilizing, at the first communication device, carrier aggregation to communicate with a second communication device in the first communication network via multiple communication channels in the unlicensed band.

The method further includes in response to determining that a first channel in the multiple communication channels is being utilized by a second wireless communication network, deactivating, at the first communication device, the first channel from use in the carrier aggregation; and in response to determining that a second channel in the unlicensed band is not being utilized by any second wireless communication networks, activating, at the first communication device, the second channel for use in the carrier aggregation.

The method further includes: while it is determined that a first channel in the multiple communication channels is being utilized by a second wireless communication network, not scheduling, at the first communication device, the second communication the device to use the first channel; and while it is determined that a second channel in the multiple communication channels is not being utilized by any second wireless communication networks, scheduling, at the first communication device, the second communication the device to use the second channel.

The communication protocol is a first communication protocol; a second wireless communication network utilizes a second communication protocol developed for use in the unlicensed band; and the method further includes: while utilizing the set of one or more communication channels for communications in the first wireless communication network, determining that the second wireless communication network is utilizing or is attempting to utilize a first channel in the set of one or more communication channels, and in response to determining that the second wireless communication network is utilizing or is attempting to utilize the first channel, temporarily quieting use of the first channel by the first communication network to permit use of the first channel by the second communication network.

Temporarily quieting use of the first channel by the first communication network comprises quieting use of the first channel by the first wireless communication network for a defined amount of time at regular intervals.

Temporarily quieting use of the first channel by the first communication network comprises transmitting, by the communication device, a multicast-broadcast single frequency network (MBSFN) subframe.

Temporarily quieting use of the first channel by the first communication network comprises transmitting, by the communication device, an almost blank subframe (ABS).

In another embodiment, an apparatus, comprises a communication device comprising one or more integrated circuit devices configured to operate in a first wireless communication network that utilizes a communication protocol developed for use in frequency bands that are licensed by a government entity for wireless communication applications, determine whether one or more communication channels in an unlicensed frequency band are not being utilized by any second wireless communication networks, wherein the government entity does not require licenses to use the unlicensed frequency band, in response to determining that one or more communication channels in the unlicensed frequency band are not being utilized by any second wireless communication networks, select a set of one or more communication channels in the one or more communication channels for use by the first wireless communication network, and utilize the set of one or more communication channels for communications in the first wireless communication network.

In other embodiments, the apparatus includes one of or any suitable combination of two or more of the following features.

The one or more integrated circuit devices are further configured to scan a plurality of communication channels in a plurality of communication channels in the unlicensed frequency band to determine whether one or more communication channels in the unlicensed frequency band are being utilized by any second wireless communication networks.

The communication protocol is a first communication protocol; and the one or more integrated circuit devices are configured to scan the plurality of communication channels for signals that conform to a second communication protocol developed for use in unlicensed frequency bands.

The second communication protocol is one of i) a wireless local area network (WLAN) communication protocol, or ii) a personal area network (PAN) communication protocol.

The communication device is a first communication device; and the one or more integrated circuit devices are further configured to receive one or more messages from one or more second communication devices operating in the first wireless communication network, the one or more messages including information indicating whether one or more communication channels in the unlicensed frequency band are not being utilized by any second communication networks, and analyze the information in the one or more messages to determine whether one or more communication channels in the unlicensed frequency band are not being utilized by any second wireless communication networks.

The communication device is a first communication device; and the one or more integrated circuit devices are further configured to utilize carrier aggregation to communicate with a second communication device in the first communication network via multiple communication channels in the unlicensed band.

The one or more integrated circuit devices are further configured to: in response to determining that a first channel in the multiple communication channels is being utilized by a second wireless communication network, deactivate the first channel from use in the carrier aggregation; and in response to determining that a second channel in the unlicensed band is not being utilized by any second wireless communication networks, activate the second channel for use in the carrier aggregation.

The one or more integrated circuit devices are further configured to: while it is determined that a first channel in the multiple communication channels is being utilized by a second wireless communication network, not schedule the second communication the device to use the first channel; and while it is determined that a second channel in the multiple communication channels is not being utilized by any second wireless communication networks, schedule the second communication the device to use the second channel.

The communication protocol is a first communication protocol; a second wireless communication network utilizes a second communication protocol developed for use in the unlicensed band; and the one or more integrated circuit devices are further configured to: while utilizing the set of one or more communication channels for communications in the first wireless communication network, determine that the second wireless communication network is utilizing or is attempting to utilize a first channel in the set of one or more communication channels, and in response to determining that the second wireless communication network is utilizing or is attempting to utilize the first channel, temporarily quiet use of the first channel by the first communication network to permit use of the first channel by the second communication network.

The one or more integrated circuit devices are further configured to quiet use of the first channel by the first wireless communication network for a defined amount of time at regular intervals.

The one or more integrated circuit devices are further configured to transmit a multicast-broadcast single frequency network (MBSFN) subframe to quiet use of the first channel by the first wireless communication network.

The one or more integrated circuit devices are further configured to transmit an almost blank subframe (ABS) to quiet use of the first channel by the first wireless communication network.

In yet another embodiment, a method is implemented by a first communication device that is configured to operate in a first wireless communication network that utilizes a communication protocol developed for use in frequency bands that are licensed for communication applications by a government entity. The method includes scanning, at the first communication device, a plurality of communication channels in an unlicensed frequency band to determine whether one or more communication channels in the unlicensed frequency band are being utilized by any second communication networks, wherein the government entity does not require licenses to use the unlicensed frequency band; based on the scanning, generating, at the first communication device, channel availability information indicating whether one or more communication channels in the unlicensed frequency band are not being utilized by any second communication networks; generating, at the first communication device, one or more messages that include the channel availability information; and transmitting, from the first communication device, the one or messages to a second communication device in the first wireless communication network using the communication protocol developed for use in frequency bands that are licensed for communication applications.

In other embodiments, the method includes one of or any suitable combination of two or more of the following features.

The communication protocol developed for use in frequency bands that are licensed for communication uses is a first communication protocol; and scanning the plurality of communication channels in the unlicensed frequency band comprises scanning the plurality of communication channels for signals that conform to a second communication protocol developed for use in unlicensed frequency bands.

Scanning the plurality of communication channels for signals that conform to the second communication protocol comprises using a scanning procedure defined by the second communication protocol.

Transmitting the one or messages comprises transmitting the one or messages using a first network interface device configured to communicate according to the first communication protocol; and scanning the plurality of communication channels comprises scanning the plurality of communication channels using a second network interface device configured to communicate according to the second communication protocol.

The second communication protocol is one of i) a wireless local area network (WLAN) communication protocol, or ii) a personal area network (PAN) communication protocol.

In still another embodiment, an apparatus, comprises a communication device comprising one or more integrated circuit devices configured to operate in a first wireless communication network that utilizes a communication protocol developed for use in frequency bands that are licensed for communication applications by a government entity, scan a plurality of communication channels in an unlicensed frequency band to determine whether one or more communication channels in the unlicensed frequency band are being utilized by any second communication networks, wherein the government entity does not require licenses to use the unlicensed frequency band, based on scanning the plurality of communication channels in the unlicensed frequency band, generate channel availability information indicating whether one or more communication channels in the unlicensed frequency band are not being utilized by any second communication networks, generate one or more messages that include the channel availability information, and transmit the one or messages to a second communication device in the first wireless communication network using the communication protocol developed for use in frequency bands that are licensed for communication applications.

In other embodiments, the apparatus includes one of or any suitable combination of two or more of the following features.

The communication protocol developed for use in frequency bands that are licensed for communication uses is a first communication protocol; and the one or more integrated circuit devices are configured to scan the plurality of communication channels for signals that conform to a second communication protocol developed for use in unlicensed frequency bands.

The one or more integrated circuit devices are configured to use a scanning procedure defined by the second communication protocol.

The communication device comprises a first network interface device configured to communicate with one or more other communication devices in the first wireless communication network utilizing the first communication protocol, and transmit the one or messages according to the first communication protocol. The communication device also comprises a second network interface device configured to communicate according to the second communication protocol, and scan the plurality of communication channels using the scanning procedure defined by the second communication protocol.

The second communication protocol is one of i) a wireless local area network (WLAN) communication protocol, or ii) a personal area network (PAN) communication protocol.

In another embodiment, a method is implemented by a communication device that is configured to operate in a first wireless communication network that utilizes a first communication protocol developed for use in frequency bands that are licensed for communication applications by a government entity, wherein the first wireless communication network is utilizing i) a first channel in an unlicensed frequency band as a primary channel and ii) a second channel in the unlicensed band as a secondary channel, and wherein the government entity does not require licenses to use the unlicensed frequency band. The method includes determining, at the communication device, that a second wireless communication network is utilizing or is attempting to utilize the first channel, wherein the second wireless communication network is utilizing a second communication protocol developed for use in the unlicensed band; and in response to determining that the second wireless communication network is utilizing or is attempting to utilize the first channel, at least one of i) utilizing, at the communication device, another channel in the unlicensed frequency band as the primary channel, or ii) not scheduling, at the communication device, communications with any other communication devices in the first wireless communication network on the first channel.

In other embodiments, the method includes one of or any suitable combination of two or more of the following features.

The method further includes broadcasting, at the first communication device, system information on both the primary channel and the secondary channel to facilitate quieting the primary channel in response to determining that the second wireless communication network is utilizing or is attempting to utilize the first channel; and maintaining, at the first communication device, a radio resource control (RCC) connection on both the primary channel and the secondary channel to facilitate quieting the primary channel in response to determining that the second wireless communication network is utilizing or is attempting to utilize the first channel.

The method further includes in response to determining that the second wireless communication network is utilizing or is attempting to utilize the first channel, switching, at the first communication device, the primary channel to the second channel, and switching, at the first communication device, the secondary channel to the first channel.

The method further includes, in response to determining that the second wireless communication network is utilizing or is attempting to utilize the first channel, restarting the first communication device to cause the first communication device to utilize another channel in the unlicensed frequency band, different than the first channel, as the primary channel.

The method further includes, in response to determining that the second wireless communication network is utilizing or is attempting to utilize the first channel, handing over, at the first communication device, a second communication device to another cell that utilizes another channel in the unlicensed frequency band, different than the first channel, as a primary channel of the other cell, wherein handing over the second communication device is performed according to the first communication protocol.

The second communication protocol is one of i) a wireless local area network (WLAN) communication protocol, or ii) a personal area network (PAN) communication protocol.

In yet another embodiment, an apparatus comprises a communication device comprising one or more integrated circuit devices configured to operate in a first wireless communication network that utilizes a first communication protocol developed for use in frequency bands that are licensed for communication applications by a government entity, utilize i) a first channel in an unlicensed frequency band as a primary channel and ii) a second channel in the unlicensed band as a secondary channel, and wherein the government entity does not require licenses to use the unlicensed frequency band, determine that a second wireless communication network is utilizing or is attempting to utilize the first channel, wherein the second wireless communication network is utilizing a second communication protocol developed for use in the unlicensed band, and in response to determining that the second wireless communication network is utilizing or is attempting to utilize the first channel, at least one of i) utilize another channel in the unlicensed frequency band as the primary channel, or ii) not schedule communications with any other communication devices in the first wireless communication network on the first channel.

In other embodiments, the apparatus includes one of or any suitable combination of two or more of the following features.

The one or more integrated circuit devices are configured to: broadcast system information on both the primary channel and the secondary channel to facilitate quieting the primary channel in response to determining that the second wireless communication network is utilizing or is attempting to utilize the first channel, and maintain a radio resource control (RCC) connection on both the primary channel and the secondary channel to facilitate quieting the primary channel in response to determining that the second wireless communication network is utilizing or is attempting to utilize the first channel.

The one or more integrated circuit devices are configured to: in response to determining that the second wireless communication network is utilizing or is attempting to utilize the first channel, switch the primary channel to the second channel, and switch the secondary channel to the first channel.

The one or more integrated circuit devices are configured to: in response to determining that the second wireless communication network is utilizing or is attempting to utilize the first channel, cause the first communication device to restart to cause the first communication device to utilize another channel in the unlicensed frequency band, different than the first channel, as the primary channel.

The one or more integrated circuit devices are configured to: in response to determining that the second wireless communication network is utilizing or is attempting to utilize the first channel, hand over a second communication device to another cell that utilizes another channel in the unlicensed frequency band, different than the first channel, as a primary channel of the other cell, wherein the hand over of the second communication device is performed according to the first communication protocol.

The second communication protocol is one of i) a wireless local area network (WLAN) communication protocol, or ii) a personal area network (PAN) communication protocol.

In still another embodiment, a method is implemented by a communication device that is configured to operate in a first wireless communication network that utilizes a first communication protocol developed for use in frequency bands that are licensed for communication applications by a government entity. The method includes: generating, at the communication device, an announcement frame that conforms to a second communication protocol developed for use in unlicensed bands, wherein the government entity does not require licenses to use the unlicensed frequency band, and the announcement frame indicates use of a channel in the unlicensed band; transmitting, with the communication device, the announcement frame in the channel in the unlicensed band according to the second communication protocol; and communicating in the channel in the unlicensed band with one or more other communication devices in the first communication network according to the first communication protocol.

In other embodiments, the method includes one of or any suitable combination of two or more of the following features.

The announcement frame comprises a beacon frame that conforms to the second communication protocol.

The announcement frame comprises a frame that is for reserving the channel for a defined time period.

The second communication protocol is a wireless local area network (WLAN) communication protocol; and the announcement frame conforms to the WLAN communication protocol.

The announcement frame comprises a beacon frame that conforms to the WLAN communication protocol.

The announcement frame comprises one of: a beacon frame that conforms to the WLAN communication protocol, a request-to-send (RTS) frame that conforms to the WLAN communication protocol, a clear-to-send (CTS) frame that conforms to the WLAN communication protocol, or a CTS-to-self frame that conforms to the WLAN communication protocol.

The method further includes: receiving, at the communication device, a request from a base station in the first wireless communication network to transmit the announcement frame; wherein transmitting the announcement frame is in response to receiving the request.

In another embodiment, an apparatus comprises a communication device having one or more integrated circuit devices configured to: operate in a first wireless communication network that utilizes a first communication protocol developed for use in frequency bands that are licensed for communication applications by a government entity, communicate in a channel in an unlicensed band with one or more other communication devices in the first wireless communication network according to the first communication protocol, wherein the government entity does not require licenses to use the unlicensed frequency band, generate an announcement frame that conforms to a second communication protocol developed for use in the unlicensed band, wherein the announcement frame indicates use of the channel in the unlicensed band, transmit the announcement frame in the channel in the unlicensed band according to the second communication protocol.

In other embodiments, the apparatus includes one of or any suitable combination of two or more of the following features.

The one or more integrated circuit devices are configured to generate the announcement frame to include a beacon frame that conforms to the second communication protocol.

The one or more integrated circuit devices are configured to generate the announcement frame to include a frame that is for reserving the channel for a defined time period and that conform to the second communication protocol.

The second communication protocol is a wireless local area network (WLAN) communication protocol; and the one or more integrated circuit devices are configured to generate the announcement frame to conform to the WLAN communication protocol.

The one or more integrated circuit devices are configured to generate the announcement frame to include a beacon frame that conforms to the WLAN communication protocol.

The one or more integrated circuit devices are configured to generate the announcement frame to include one of: a beacon frame that conforms to the WLAN communication protocol, a request-to-send (RTS) frame that conforms to the WLAN communication protocol, a clear-to-send (CTS) frame that conforms to the WLAN communication protocol, or a CTS-to-self frame that conforms to the WLAN communication protocol.

The one or more integrated circuit devices are configured to: receive a request from a base station in the first wireless communication network to transmit the announcement frame; and transmit the announcement frame in response to receiving the request.

The communication device comprises: a first network interface device configured to communicate with one or more other communication devices in the first wireless communication network utilizing the first communication protocol; and a second network interface device configured to communicate according to the second communication protocol, and transmit the announcement frame according to the second communication protocol.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any tangible, non-transitory computer readable medium or media such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

While the present disclosure has been described with reference to specific examples, which are intended to be illustrative only and not to be limiting of the invention, changes, additions and/or deletions may be made to the disclosed embodiments without departing from the scope of the invention.

What is claimed is:

1. A method implemented by a communication device that is configured to operate in a first wireless communication network that utilizes a communication protocol developed for use in frequency bands that are licensed by a government entity for wireless communication applications, the method comprising:
    determining, at the communication device, whether one or more communication channels in an unlicensed frequency band are not being utilized by any second wireless communication networks, wherein the government entity does not require licenses to use the unlicensed frequency band, and wherein determining whether the one or more communication channels in the unlicensed frequency band are not being utilized by any second wireless communication networks includes using a clear channel assessment function defined by a communication protocol developed for use in the unlicensed frequency band;
    in response to determining that one or more communication channels in the unlicensed frequency band are not being utilized by any second wireless communication networks, selecting, at the communication device, a set of one or more communication channels in the one or more communication channels for use by the first wireless communication network;
    utilizing, at the communication device, the set of one or more communication channels for communications in the first wireless communication network;
    while utilizing the set of one or more communication channels for communications in the first wireless communication network, determining, at the communication device, that a second wireless communication network is utilizing or is attempting to utilize a first channel in the set of one or more communication channels; and
    in response to determining that the second wireless communication network is utilizing or is attempting to utilize the first channel, the communication device temporarily quieting use of the first channel by the first communication network to permit use of the first channel by the second communication network,
    wherein temporarily quieting use of the first channel by the first communication network includes one of:
        transmitting, by the communication device, a multicast-broadcast single frequency network (MBSFN) subframe, and
        transmitting, by the communication device, an almost blank subframe (ABS).

2. The method of claim 1, wherein determining whether one or more communication channels in the unlicensed frequency band are not being utilized by any second wireless communication networks comprises scanning, at the communication device, a plurality of communication channels in the unlicensed frequency band to determine whether one or more communication channels in the unlicensed frequency band are being utilized by any second wireless communication networks.

3. The method of claim 2, wherein scanning the plurality of communication channels comprises scanning the plurality of communication channels for signals that conform to the communication protocol developed for use in the unlicensed frequency band.

4. The method of claim 3, wherein the communication protocol developed for use in the unlicensed frequency band is one of i) a wireless local area network (WLAN) communication protocol, or ii) a personal area network (PAN) communication protocol.

5. The method of claim 1, wherein:
    the communication device is a first communication device;
    the method further comprises receiving, at the first communication device, one or more messages from one or more second communication devices operating in the first wireless communication network, the one or more messages including information indicating whether one or more communication channels in the unlicensed frequency band are not being utilized by any second communication networks; and
    determining whether one or more communication channels in the unlicensed frequency band are not being utilized by any second wireless communication networks comprises analyzing, at the first communication device, the information in the one or more messages.

6. The method of claim 1, wherein:
    the communication device is a first communication device; and
    the method comprises utilizing, at the first communication device, carrier aggregation to communicate with a second communication device in the first communication network via multiple communication channels in the unlicensed band.

7. The method of claim 6, further comprising:
    in response to determining that a first channel in the multiple communication channels is being utilized by a second wireless communication network, deactivating, at the first communication device, the first channel from use in the carrier aggregation; and
    in response to determining that a second channel in the unlicensed band is not being utilized by any second wireless communication networks, activating, at the first communication device, the second channel for use in the carrier aggregation.

8. The method of claim 6, further comprising:
    while it is determined that a first channel in the multiple communication channels is being utilized by a second wireless communication network, not scheduling, at the first communication device, the second communication device to use the first channel; and
    while it is determined that a second channel in the multiple communication channels is not being utilized by any second wireless communication networks, scheduling, at the first communication device, the second communication device to use the second channel.

9. The method of claim 1, wherein:
    the second wireless communication network utilizes the communication protocol developed for use in the unlicensed frequency band.

10. The method of claim 1, wherein temporarily quieting use of the first channel by the first communication network comprises quieting use of the first channel by the first wireless communication network for a defined amount of time at regular intervals.

11. An apparatus, comprising:
    a communication device comprising one or more integrated circuit devices configured to operate in a first wireless communication network that utilizes a communication protocol developed for use in frequency bands that are licensed by a government entity for wireless communication applications, determine whether one or more communication channels in an unlicensed frequency band are not being utilized by any second wireless communication networks, wherein the government entity does not require licenses to use the unlicensed frequency band, and wherein determining whether the one or more communication channels in the unlicensed frequency band are not being utilized by any second wireless communication networks includes using a clear channel assessment function defined by a communication protocol developed for use in the unlicensed frequency band, in response to determining that one or more communication channels in the unlicensed frequency band are not being utilized by any second wireless communication networks, select a set of one or more communication channels in the one or more communication channels for use by the first wireless communication network, utilize the set of one or more communication channels for communications in the first wireless communication network, while utilizing the set of one or more communication channels for communications in the first wireless communication network, determine that a second wireless communication network is utilizing or is attempting to utilize a first channel in the set of one or more communication channels; and in response to determining that the second wireless communication network is utilizing or is attempting to utilize the first channel, temporarily quiet use of the first channel by the first communication network to permit use of the first channel by the second communication network, wherein the one or more integrated circuit devices are configured to transmit one of (i) a multicast-broadcast single frequency network (MBSFN) subframe and (ii) an almost blank subframe (ABS) to quiet use of the first channel by the first wireless communication network.

12. The apparatus of claim 11, wherein the one or more integrated circuit devices are further configured to scan a plurality of communication channels in the unlicensed frequency band to determine whether one or more communication channels in the unlicensed frequency band are being utilized by any second wireless communication networks.

13. The apparatus of claim 12, wherein
the one or more integrated circuit devices are configured to scan the plurality of communication channels for signals that conform to the communication protocol developed for use in the unlicensed frequency bands.

14. The apparatus of claim 13, wherein the communication protocol is one of i) a wireless local area network (WLAN) communication protocol, or ii) a personal area network (PAN) communication protocol.

15. The apparatus of claim 11, wherein:
the communication device is a first communication device; and
the one or more integrated circuit devices are further configured to
receive one or more messages from one or more second communication devices operating in the first wireless communication network, the one or more messages including information indicating whether one or more communication channels in the unlicensed frequency band are not being utilized by any second communication networks, and analyze the information in the one or more messages to determine whether one or more communication channels in the unlicensed frequency band are not being utilized by any second wireless communication networks.

16. The apparatus of claim 11, wherein:
the communication device is a first communication device; and
the one or more integrated circuit devices are further configured to utilize carrier aggregation to communicate with a second communication device in the first communication network via multiple communication channels in the unlicensed band.

17. The apparatus of claim 16, wherein the one or more integrated circuit devices are further configured to:
while it is determined that a first channel in the multiple communication channels is being utilized by a second wireless communication network, not schedule the second communication device to use the first channel; and
while it is determined that a second channel in the multiple communication channels is not being utilized by any second wireless communication networks, schedule the second communication device to use the second channel.

18. The apparatus of claim 16, wherein the one or more integrated circuit devices are further configured to:
in response to determining that a first channel in the multiple communication channels is being utilized by a second wireless communication network, deactivate the first channel from use in the carrier aggregation; and
in response to determining that a second channel in the unlicensed band is not being utilized by any second wireless communication networks, activate the second channel for use in the carrier aggregation.

19. The apparatus of claim 11, wherein:
the second wireless communication network utilizes the communication protocol developed for use in the unlicensed frequency band.

20. The apparatus of claim 11, wherein the one or more integrated circuit devices are further configured to quiet use of the first channel by the first wireless communication network for a defined amount of time at regular intervals.

21. A method implemented by a first communication device that is configured to operate in a first wireless communication network that utilizes a communication protocol developed for use in frequency bands that are licensed for communication applications by a government entity, the method comprising:
scanning, at the first communication device, a plurality of communication channels in an unlicensed frequency band to determine whether one or more communication channels in the unlicensed frequency band are being utilized by any second communication networks, wherein the government entity does not require licenses to use the unlicensed frequency band, and wherein the scanning is performed according to a channel scanning function defined by a communication protocol developed for use in the unlicensed frequency band;
based on the scanning, generating, at the first communication device, channel availability information indicating whether one or more communication channels in the unlicensed frequency band are not being utilized by any second communication networks;
generating, at the first communication device, one or more messages that include the channel availability information; and
transmitting, from the first communication device, the one or more messages to a second communication device in the first wireless communication network using the communication protocol developed for use in frequency bands that are licensed for communication applications.

22. The method of claim 21, wherein:
scanning the plurality of communication channels in the unlicensed frequency band comprises scanning the plurality of communication channels for signals that conform to the communication protocol developed for use in the unlicensed frequency bands.

23. The method of claim 21, wherein:
transmitting the one or more messages comprises transmitting the one or more messages using a first network interface device configured to communicate according to the communication protocol developed for use in frequency bands that are licensed for communication applications; and
scanning the plurality of communication channels comprises scanning the plurality of communication channels using a second network interface device configured to communicate according to the communication protocol developed for use in the unlicensed frequency band.

24. The method of claim 21, wherein the communication protocol developed for use in the unlicensed frequency band is one of i) a wireless local area network (WLAN) communication protocol, or ii) a personal area network (PAN) communication protocol.

25. An apparatus, comprising:
a communication device comprising one or more integrated circuit devices configured to
operate in a first wireless communication network that utilizes a communication protocol developed for use in frequency bands that are licensed for communication applications by a government entity,
scan a plurality of communication channels in an unlicensed frequency band to determine whether one or more communication channels in the unlicensed frequency band are being utilized by any second communication networks, wherein the government entity does not require licenses to use the unlicensed frequency band, and wherein the scanning is performed according to a channel scanning function defined by a communication protocol developed for use in the unlicensed frequency band,
based on scanning the plurality of communication channels in the unlicensed frequency band, generate channel availability information indicating whether one or more communication channels in the unlicensed frequency band are not being utilized by any second communication networks,
generate one or more messages that include the channel availability information, and
transmit the one or more messages to a second communication device in the first wireless communication network using the communication protocol developed for use in frequency bands that are licensed for communication applications.

26. The apparatus of claim 25, wherein:
the one or more integrated circuit devices are configured to scan the plurality of communication channels for signals that conform to the communication protocol developed for use in the unlicensed frequency bands.

27. The apparatus of claim 25, wherein the communication device comprises:
a first network interface device configured to
communicate with one or more other communication devices in the first wireless communication network utilizing the communication protocol developed for use in frequency bands that are licensed for communication applications, and
transmit the one or more messages according to the communication protocol developed for use in frequency bands that are licensed for communication applications; and
a second network interface device configured to
communicate according to the communication protocol developed for use in the unlicensed frequency band, and
scan the plurality of communication channels using the scanning procedure defined by the communication protocol developed for use in the unlicensed frequency band.

28. The apparatus of claim 25, wherein the communication protocol developed for use in the unlicensed frequency band is one of i) a wireless local area network (WLAN) communication protocol, or ii) a personal area network (PAN) communication protocol.

* * * * *